(12) United States Patent
Conrad

(10) Patent No.: US 11,726,267 B2
(45) Date of Patent: Aug. 15, 2023

(54) TWO-PIECE FIBER OPTIC ADAPTER WITH LATCH MECHANISM TRAPPED UNDER PANEL

(71) Applicant: US Conec Ltd., Hickory, NC (US)

(72) Inventor: Craig M. Conrad, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 17/890,386

(22) Filed: Aug. 18, 2022

(65) Prior Publication Data
US 2023/0059251 A1 Feb. 23, 2023

Related U.S. Application Data

(60) Provisional application No. 63/234,995, filed on Aug. 19, 2021.

(51) Int. Cl.
*G02B 6/00* (2006.01)
*G02B 6/38* (2006.01)

(52) U.S. Cl.
CPC ......... *G02B 6/3825* (2013.01); *G02B 6/3831* (2013.01); *G02B 6/3897* (2013.01)

(58) Field of Classification Search
CPC .. G02B 6/3825; G02B 6/3831; G02B 6/3897; G02B 6/00
See application file for complete search history.

(56) References Cited

U.S. PATENT DOCUMENTS

| 6,554,484 B2* | 4/2003 | Lampert | G02B 6/4296 |
| | | | 439/489 |
| 7,387,447 B2* | 6/2008 | Mudd | G02B 6/3831 |
| | | | 385/60 |
| 11,366,273 B2* | 6/2022 | Philippe | G02B 6/3849 |

FOREIGN PATENT DOCUMENTS

WO  WO-2020160254 A1 * 8/2020 ........... G02B 6/3825

* cited by examiner

*Primary Examiner* — Jennifer Doan
(74) *Attorney, Agent, or Firm* — Michael L Leetzow PLLC; Shubhrangshu Sengupta

(57) ABSTRACT

A combination of an adapter panel and at least one two-piece fiber optic adapter includes an adapter panel having a first side and a second side, the adapter panel having a window extending between the first side and the second side, the adapter panel having a thickness and a two-piece fiber optic adapter formed by joining a first piece to a second piece via a latching mechanism, each of the first piece and second piece having a longitudinal opening to receive fiber optic connectors from either side of the adapter panel. The latching mechanism is positioned at least partially within the window and the thickness of the adapter panel.

17 Claims, 11 Drawing Sheets

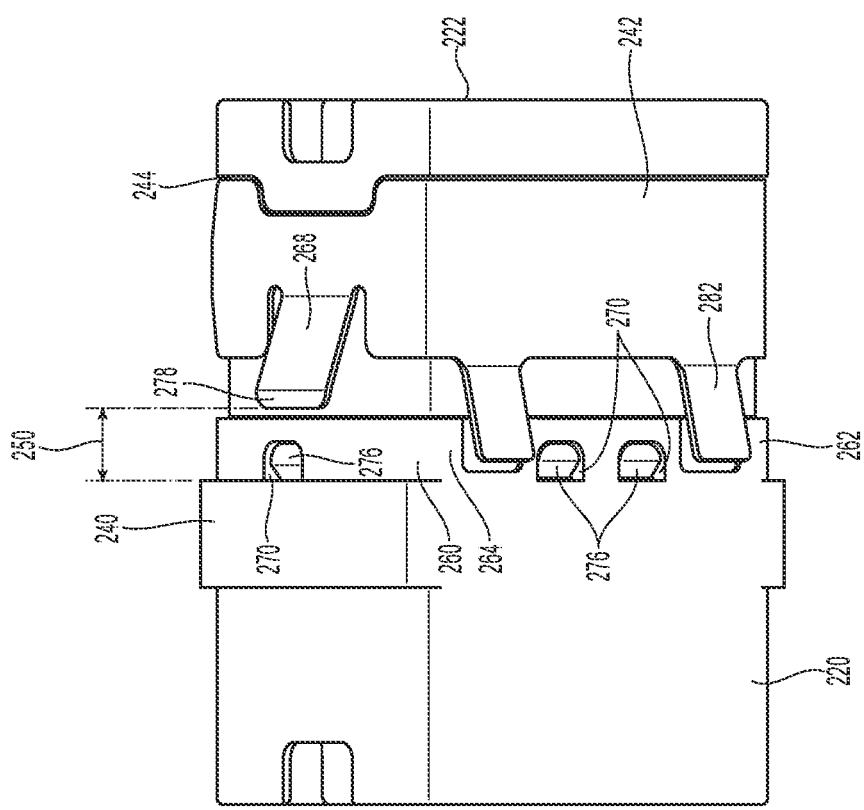

TWO-PIECE FIBER OPTIC ADAPTER WITH LATCH MECHANISM TRAPPED UNDER PANEL

REFERENCE TO RELATED CASE

This application claims priority under 35 U.S.C. § 119 (e) to U.S. provisional application No. 63/234,995 filed on Aug. 19, 2021, the contents of which are hereby incorporated by reference in their entirety.

BACKGROUND OF THE INVENTION

Fiber optic adapters are often used with an adapter panel to connect fiber optic connectors from either side of the adapter panel. Certain fiber optic adapters are of a two-piece construction such that one piece thereof attaches to the other via a latching mechanism or a locking mechanism. This latching mechanism functions to keep the two pieces together.

However, these conventional two-piece adapters are harder to qualify in a 90° proof load test. In this test, a force perpendicular to the longitudinal dimension of the fiber optic adapter causes the two-piece fiber optic adapter to disassemble, when such latching mechanisms come apart under this force. This happens because once the fiber optic adapter is attached to the adapter panel, there is no, or not enough, structure in the latching mechanism of these conventional adapters that can physically prevent the latching mechanism from coming apart under such external forces. Typically, the latching mechanism is outside the adapter panel and is exposed. A similar scenario may also arise in the field when fiber optic connectors are present with the adapters in a panel. In that scenario, an accidental tug on the fiber cable or the connectors may cause the two-piece adapter to come apart, and/or dislodge the fiber optic adapter from the panel, causing a failed optical connection.

Accordingly, Applicant has identified a need for a better securing or latching mechanism for such two-piece adapters attached to an adapter panel, and in particular, when there is a need for a 90° proof load test qualification.

SUMMARY OF THE INVENTION

According to one aspect, the present invention is directed to a two-piece fiber optic adapter that includes a first piece joined to a second piece to form a main body, the main body having a longitudinal opening in which to mate a pair of optical connectors, each of the first piece and the second piece having a top side, a bottom side, and two opposite sides joined by the top side and the bottom side respectively, the first piece having a receiving portion that receives an insertion portion of the second piece within the longitudinal opening in the first piece to form an overlapped portion of the first piece and the second piece, wherein one of the first piece and the second piece has at least one projection and the other of the first piece and the second piece having at least one receptacle to receive the at least one projection within the overlapped portion.

In some embodiments, the overlapped portion has a first dimension in a longitudinal direction and an adapter panel into which the main body is inserted has a thickness having a second dimension, the first dimension being smaller than the second dimension.

In some embodiments, the at least one projection comprises at least two projections and the at least one receptacle comprises at least two receptacles.

In some embodiments, the overlapped portion, the at least one projection, and the at least one receptacle form a latching mechanism.

In some embodiments, wherein the latching mechanism is in a middle portion of the main body.

In yet another aspect, there is a two-piece fiber optic adapter that includes a first piece joined to a second piece to form a main body, the main body having a longitudinal opening in which to mate a pair of optical connectors, each of the first piece and the second piece having a top side, a bottom side, and two opposite sides joined by the top side and the bottom side respectively, the first piece having a receiving portion that receives an insertion portion of the second piece within the longitudinal opening in the first piece to form an overlapped portion of the main body, wherein one of the first piece and the second piece has at least one projection and the other of the first piece and the second piece has at least one receptacle to receive the at least one projection within the overlapped portion, wherein the main body has a middle portion and the overlapped portion, the at least one projection and the at least one receptacle form a latching mechanism at the middle portion, and wherein the latching mechanism is positioned for being trapped by an adapter panel into which the two-piece fiber optic adapter is inserted.

In some embodiments, the overlapped portion has a first dimension in a longitudinal direction and the adapter panel into which the main body is inserted has a thickness having a second dimension, the first dimension is smaller than the second dimension.

In some embodiments, the latching mechanism is substantially trapped by the adapter panel once the main body is attached to the adapter panel.

In some embodiments, the at least one projection comprises at least two projections and the at least one receptacle comprises two receptacles.

In some embodiments, the latching mechanism is in a middle portion of the main body.

In yet another aspect, there is a combination of an adapter panel and at least one two-piece fiber optic adapter that includes an adapter panel having a first side and a second side, the adapter panel having a window extending between the first side and the second side, the adapter panel having a thickness; and a two-piece fiber optic adapter formed by joining a first piece to a second piece via a latching mechanism, each of the first piece and second piece having a longitudinal opening to receive fiber optic connectors from either side of the adapter panel, wherein the latching mechanism is positioned at least partially within the window and the thickness of the adapter panel.

In some embodiments, there is a latching mechanism positioned completely between the first side and the second side of the adapter panel inside the window.

In some embodiments, at least a portion of the latching mechanism engages the adapter panel when a force substantially parallel to a plane of the adapter panel is encountered by the two-piece fiber optic adapter In some embodiments, a first piece has a front end and the second piece has a front end, the front end of one of the first piece and the second piece can be received inside the front end of the other of the first piece and the second piece.

In some embodiments, the latching mechanism further includes a plurality of projections on the front end of one of the first piece and the second piece, and a plurality of receptacles on the front end of the other of the first piece and the second piece to receive a corresponding one of the plurality of projections.

In some embodiments, the latching mechanism is in a middle portion of the two-piece fiber optic adapter.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 9 is side a perspective view of the two-piece fiber optic adapter in FIG. 7;

DETAILED DESCRIPTION OF THE INVENTION

Figure 1:
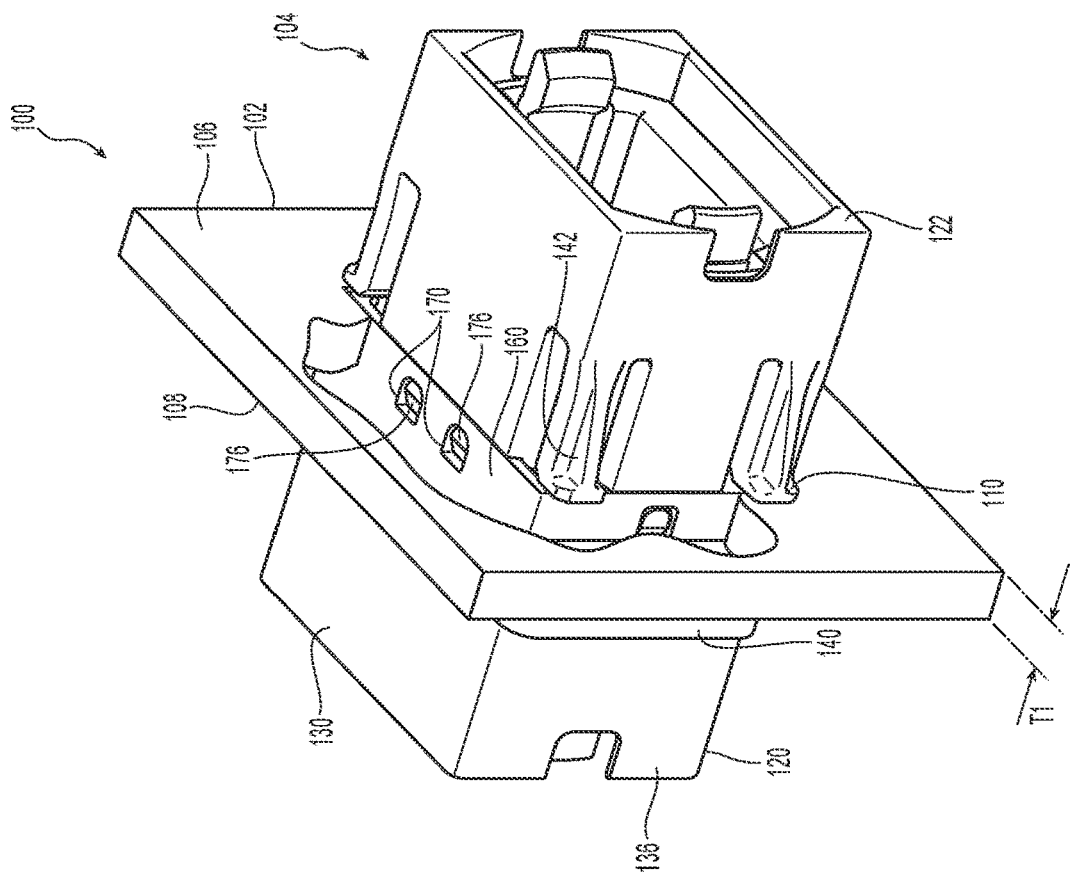
FIG. 1 is a perspective view of one embodiment of a combination of an adapter panel and a two-piece fiber optic adapter according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
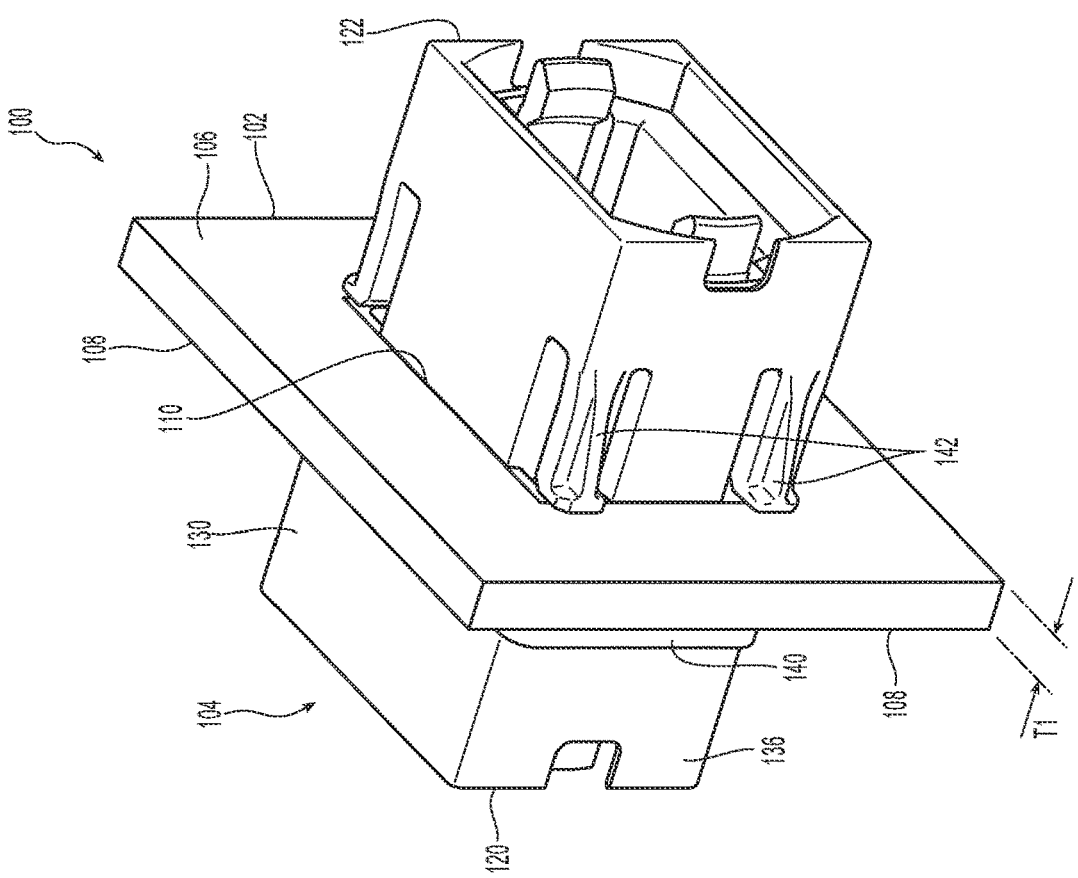
FIG. 2 is a side perspective view the combination of the adapter panel and the two-piece fiber optic adapter in FIG. 1 with a portion of the adapter panel removed to show a portion of the latching mechanism.

Illustrated in FIGS. 1 and 2 is one embodiment of a combination 100 of an adapter panel 102 and a two-piece fiber optic adapter 104 according to the present invention. The adapter panel 102 has a first side 106 and a second side 108, the adapter panel 102 has a window 110 extending between the first side 106 and the second side 108. The adapter panel 102 has a dimension or thickness T1 between the first side 106 and the second side 108. As discussed in more detail below, the adapter panel 102 may have a smaller thickness or a larger thickness, depending on the location and use of the adapter panel 102. The adapter panel 102 may be a standard adapter panel according to various industry standards, such as the TIA standards known to one of ordinary skill in the art. Alternatively, the present invention is directed to the use of any type of adapter panel—standard or non-standard/custom.

The two-piece fiber optic adapter 104 preferably comprises a first piece 120 joined to a second piece 122 to form a main body 124. The main body 124 has a longitudinal opening 126 extending along the main body 124 to mate a pair of optical connectors (not shown). Each of the first piece 120 and the second piece 122 have a top side 130, a bottom side 132, and two opposite sides 134,136 joined by the top side 130 and the bottom side 132, respectively. It should be noted that "top," "bottom," and "sides" are relative terms to define the relationship between the elements of the claimed invention. It is possible that the top and bottom sides could be considered the "opposite" sides. It also should be noted that the top side 130 and the bottom side 132 are on opposing sides of the longitudinal opening 126.

The two-piece fiber optic adapter 104 preferably has at least one flange 140 on the opposing sides 134,136 of the two-piece fiber optic adapter 104 but preferably includes two flanges. As noted above, the naming of the sides is for convention and the flanges 140 may also be on the top side 130 and bottom side 132. As illustrated, there are two flanges 140 on the first piece 120. The flanges 140 engage the second side 108 of the adapter panel 102 to prevent the main body 124 from passing completely through the window 110 (and to the right in FIG. 1). The flanges 140, the location of the flanges, and the function of the flanges 140 are known in the art.

Figure 4:
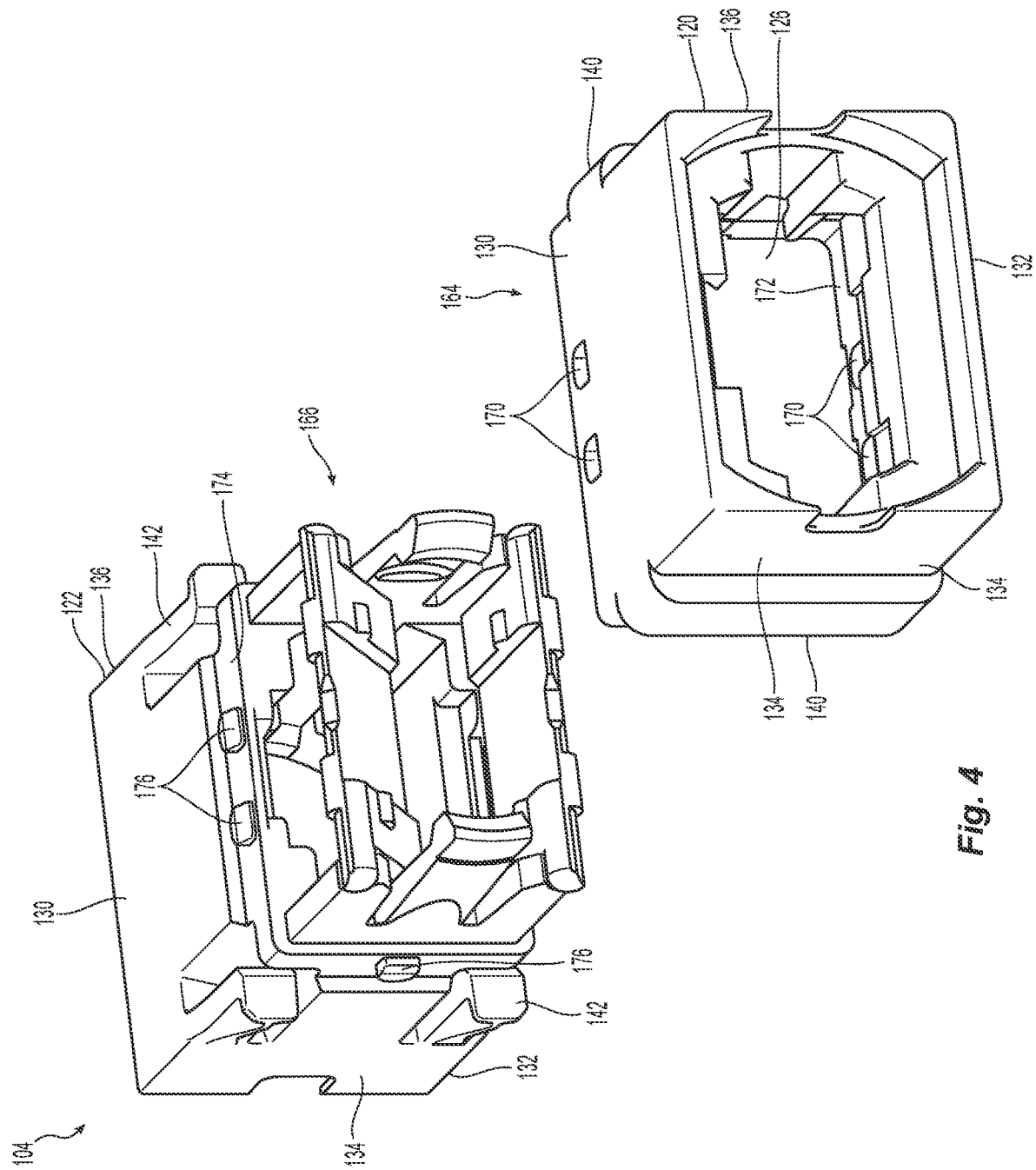
FIG. 4 is a perspective view from one end of the two-piece fiber optic adapter in FIG. 1 separated into two pieces.

As noted above, the second piece 122 of the two-piece fiber optic adapter 104 also has a longitudinal opening 126, a top side 130, a bottom side 132, and two opposite sides 134,136 joined by the top side 130 and the bottom side 132. There is also illustrated in FIG. 4 shutters to prevent dust and/or debris from entering the longitudinal opening 126. It should be noted that the internal components could be different and the two-piece fiber optic adapter 104 would still fall within the scope of the present invention. For example, the two-piece fiber-optic adapter 104 may have an eye safety shutter inside to prevent harm to the eyes of a user operating the two-piece fiber-optic adapter 104.

Figure 3:
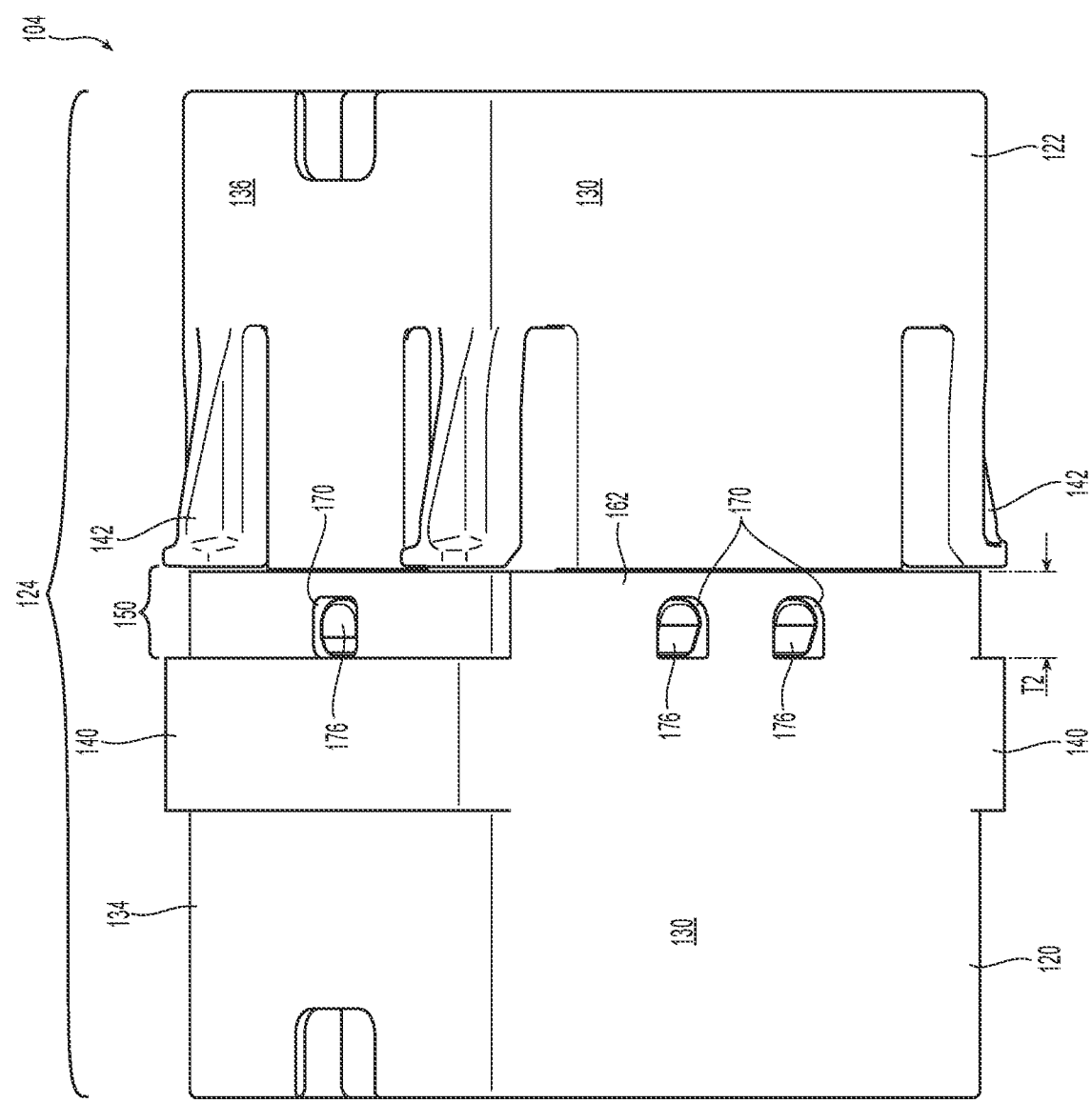
FIG. 3 is a side perspective view of the two-piece fiber optic adapter in FIG. 1.

The second piece 122 of the two-piece fiber optic adapter 104 has integral, external latches 142 that keep the two-piece fiber optic adapter 104 from being pulled from the adapter panel 102. The external latches 142 are further described in Applicant's pending U.S. patent application Ser. No. 17/669,758, the contents of which are incorporated herein by reference. It will be recognized by one of skill in the art that the two-piece fiber optic adapter 104 is inserted from the left and behind the adapter panel 102 in FIGS. 1 and 2 (i.e., from the second side 108). Turning to FIG. 3, there is illustrated a space 150 between the flanges 140 on the first piece 120 and the integral, external latches 142 on the second piece 122. The space 150 is where the adapter panel 102 is disposed during use. As noted above, the adapter panel 102 may have a dimension or thickness T1 that is slightly smaller than the dimension or thickness T2 of space 150.

The space 150 is also the location of a latching mechanism 160 according to the present invention. It will be appreciated that as discussed herein, the latching mechanism 160 is different from the external latches 142. As seen in FIG. 3, the space 150 is in a middle portion of the main body 154. The latching mechanism 160 includes an overlapped portion 162 of the main body 154 of the two-piece fiber optic adapter 104. The overlapped portion 162 is best explained with reference to FIGS. 3-5. The first piece 120 has a front end 164 and the second piece 122 has a front end 166, the front end 166 of the second piece 122 fitting within the first piece 120. At the front end 164 of the first piece 120 are a plurality of receptacles 170. The receptacles 170 preferably extend between the outside of the first piece and the longitudinal opening 126. However, the receptacles 170 may also present only on the inside of the first piece 120 and not penetrate the sides completely. Also at the front end 164 of the first piece 120 is a reduced thickness 172 of the sides (130,132,134, 136). See FIGS. 4 and 5. This reduced thickness 172 mates with a recessed portion 174 on the front end 166 of the second piece 122. On the recessed portion 174 are projections 176 that are positioned to be received in the receptacles 170 when the first piece 120 is mated with the second piece 122 to form the main body 124. This junction creates the overlapped portion 162. Illustrated in the figures are two of the receptacles 170/projections 176 on the top side 130 and bottom side 132, while only one of the receptacles 170/projections 176 is on each of the sides 134,136. In this way, the differing number of receptacles 170/projections 176 acts as a key for mating the first piece 120 and the second piece 122. However, there could be the same number on all sides, and that number could be greater than two. The configuration of the reduced thickness 172 and the recessed portion 174 (the overlapped portion 162) provides for flat surfaces along the length of the main body 124, eliminating any surfaces or edges that could get caught on the window 110 of the adapter panel 102 during insertion or removal of the two-piece fiber optic adapter 104. It should also be noted that the receptacles 170/projections 176 could be on the other of the pieces. That is, the receptacles 170 could be on the second piece 122 and the projections 176 could be on the first piece 120. Naturally, the reduced thickness 172 and the recessed portion 174 could also be accordingly on the other of the pieces as well.

Figure 5:
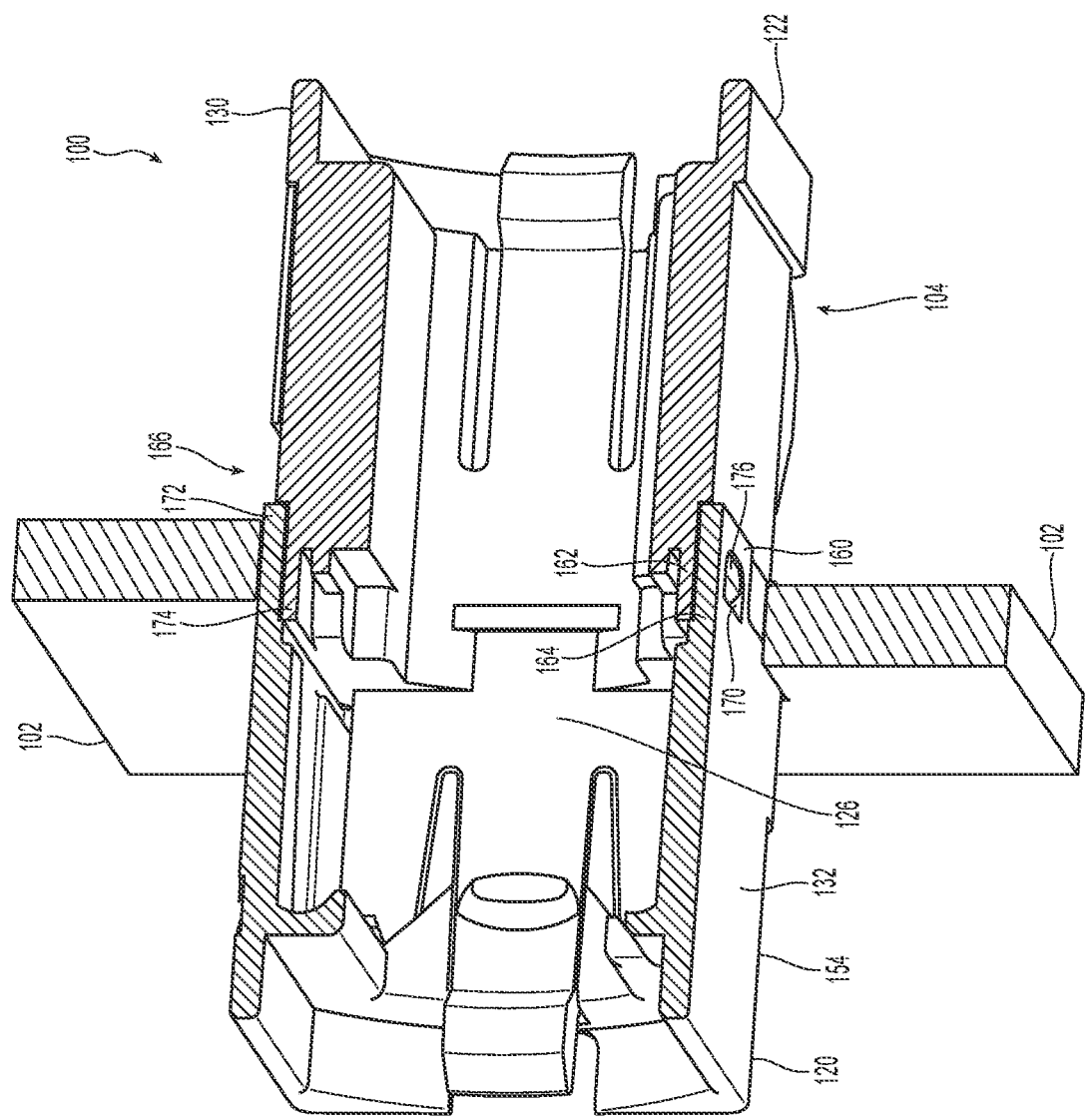
FIG. 5 is a cross sectional view of the two-piece fiber optic adapter and adapter panel in FIG. 1.
Figure 6:
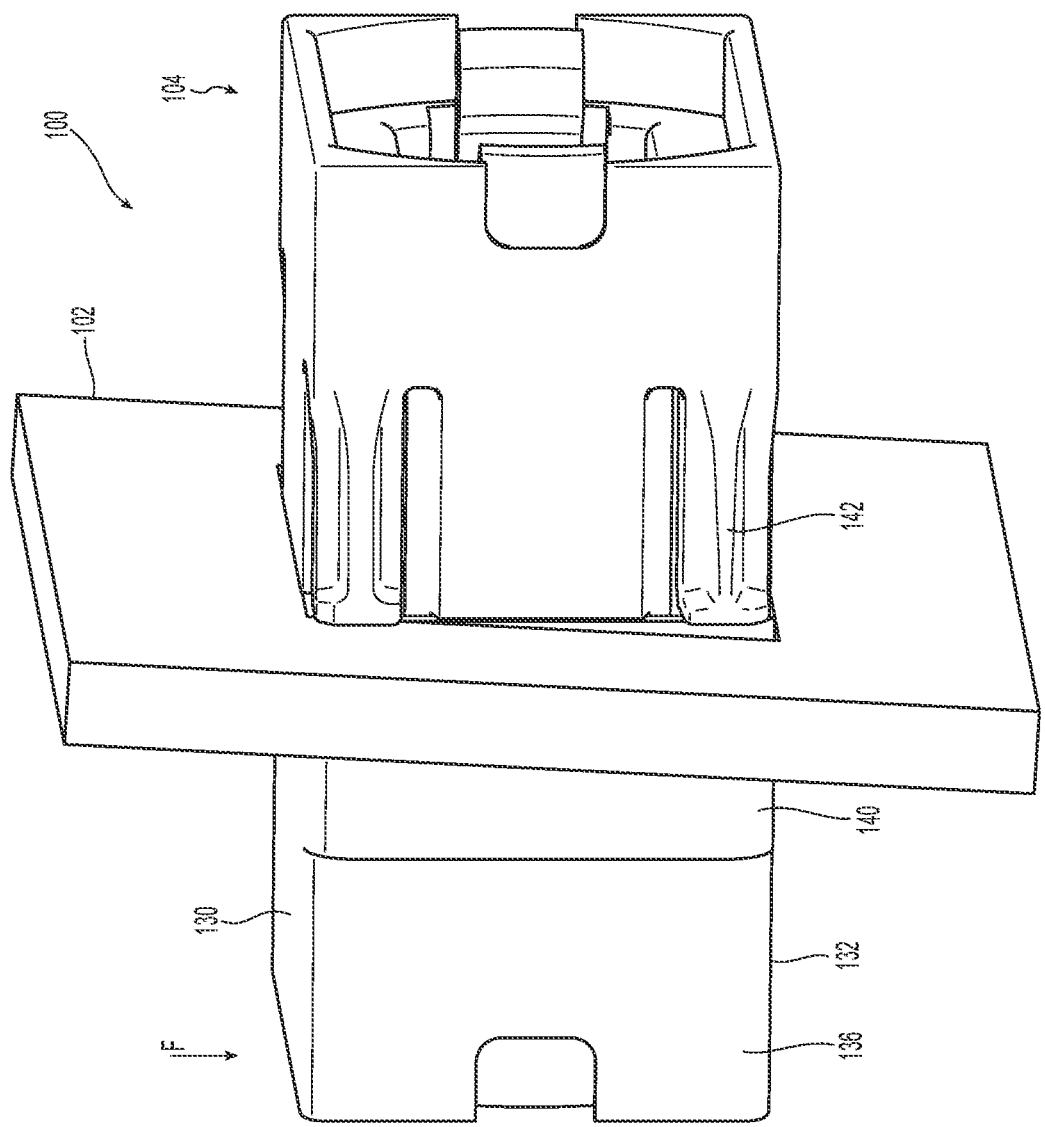
FIG. 6 is a side perspective view of the two-piece fiber optic adapter and adapter panel in FIG. 1 with a load applied to the two-piece fiber optic adapter.

The latching mechanism 160, which includes the overlapped portion 162 and the receptacles 170/projections 176, is disposed to be at least partially within the window 110 of the adapter panel 102 as can be determined from FIGS. 3 and 5. Depending on the thickness T1 of the adapter panel 102, the entirety of the latching mechanism 160 would be between the first side 106 and a second side 108 if the adapter panel 102 was the same thickness as space 150. As illustrated in FIG. 6, putting a 90° proof load test in the direction of the arrow F, the two-piece fiber optic adapter 104 will push against the adapter panel 102 within the window 110, pushing the front end 164 of the first piece 120 against the second piece 122, preventing the two pieces 120,122 from separating. That is, the window 110 blocks the latching mechanism 160 such that even under load conditions, there is no space for the projections 176 to disengage from the receptacles 170. This particular positioning of the latching mechanism 160 trapped inside the window 110 makes it easy to qualify the adapter for proof load testing per various industry standards. FIG. 6 shows the adapter panel 102 at an angle relative to the longitudinal axis of the two-piece fiber optic adapter 104 under load.

Figure 8:
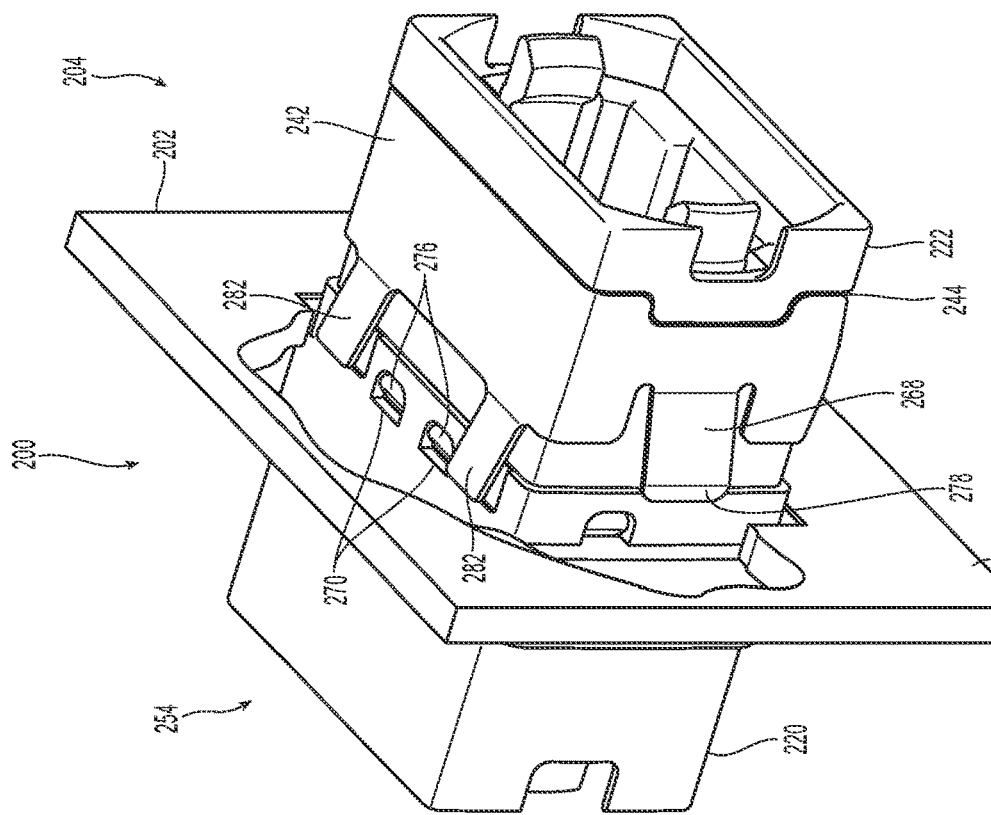
FIG. 8 is a side perspective view the combination of the adapter panel and the two-piece fiber optic adapter in FIG. 7 with a portion of the adapter panel removed to show a portion of the latching mechanism.
Figure 7:
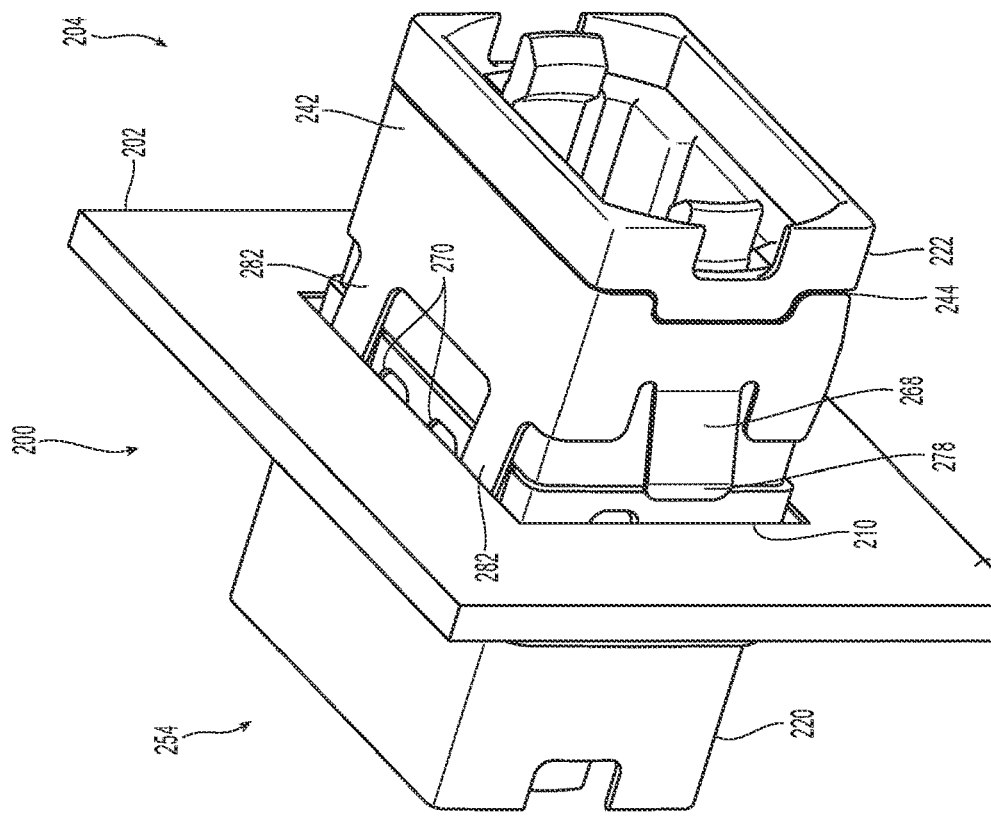
FIG. 7 is a perspective view of a second embodiment of a combination of an adapter panel and a two-piece fiber optic adapter according to the present invention.
Figure 8A:
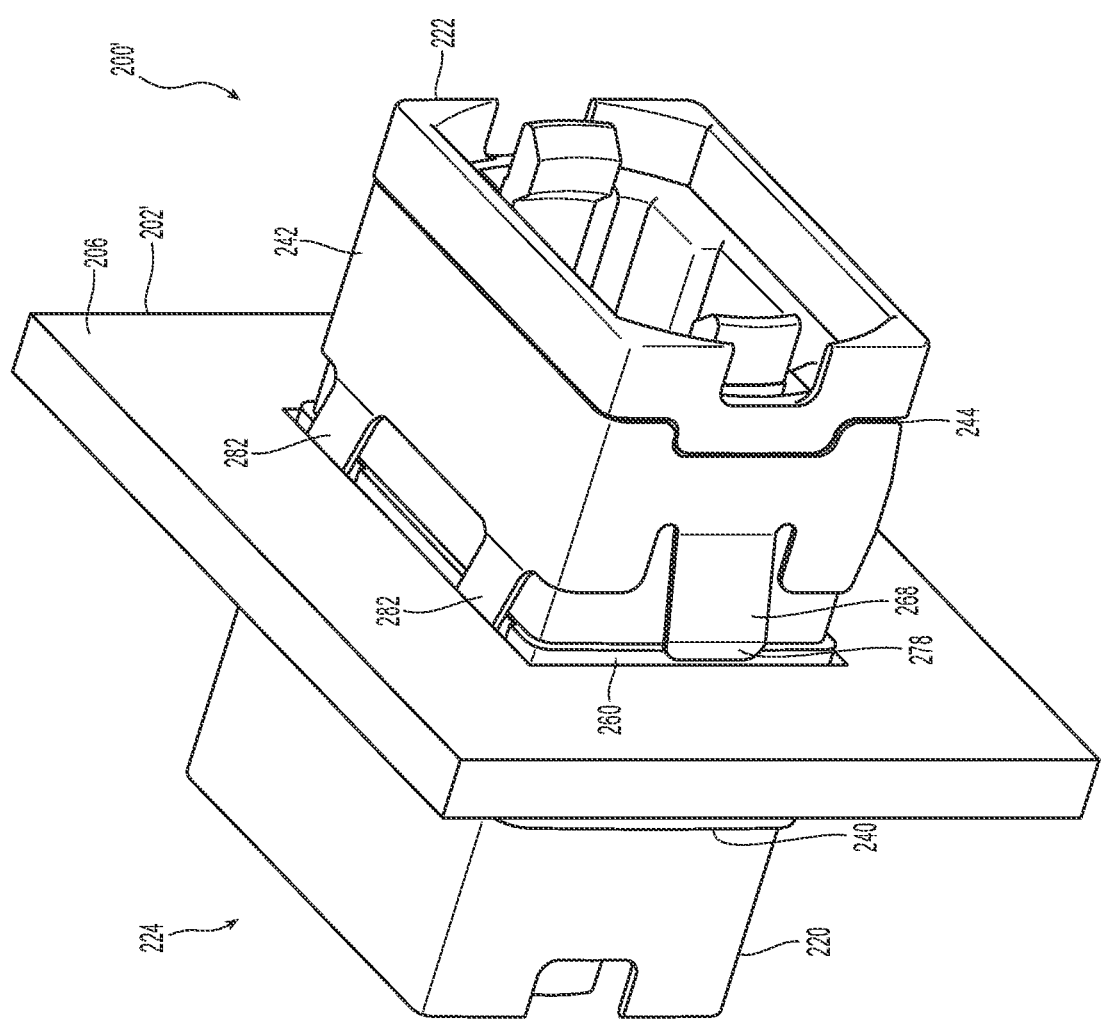
FIG. 8A is a side perspective view the combination of the adapter panel and the two-piece fiber optic adapter in FIG. 7 with a thicker adapter panel.
Figure 10:
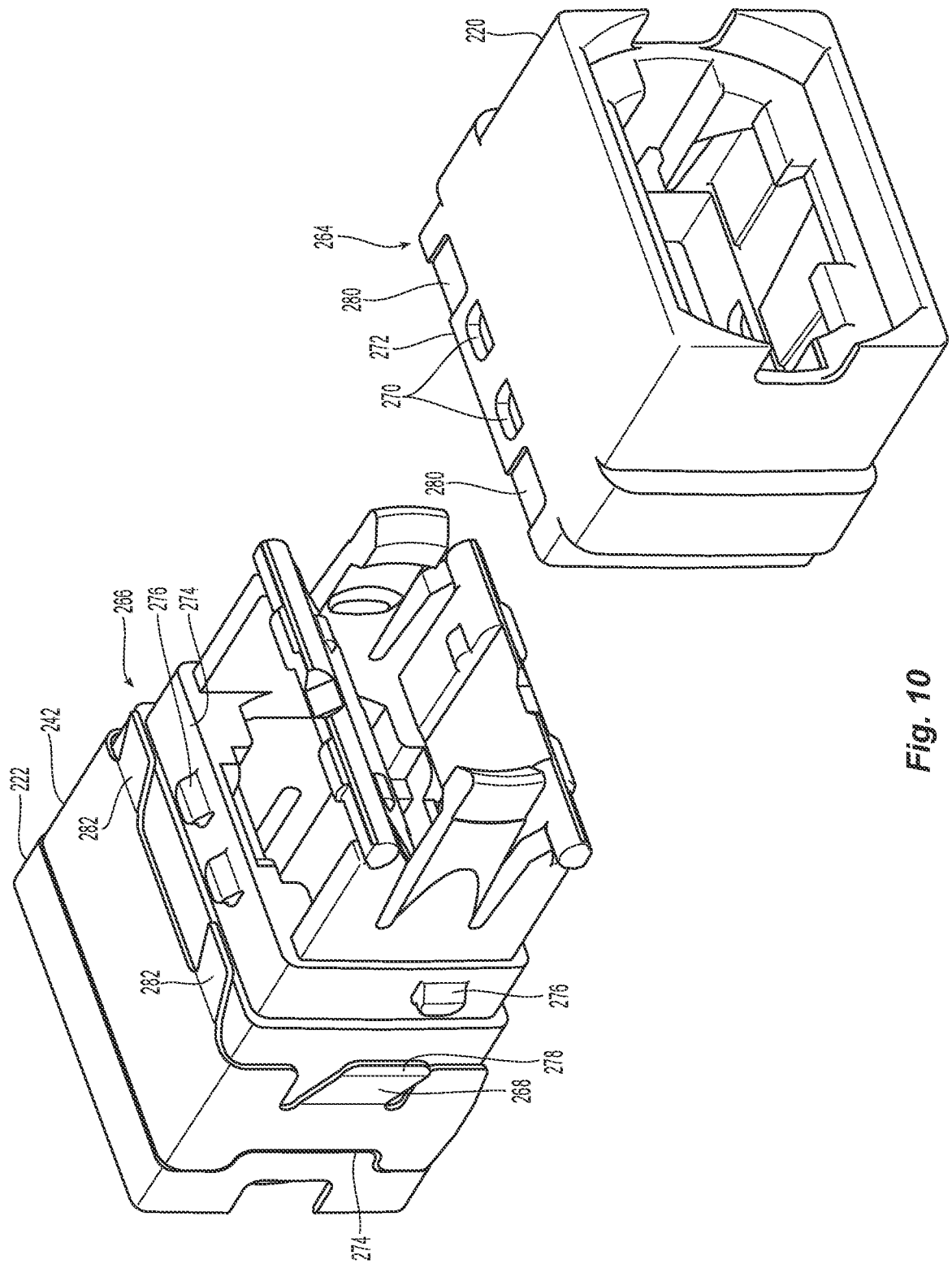
FIG. 10 is a perspective view from one end of the two-piece fiber optic adapter in FIG. 7 separated into two pieces.

A second embodiment of a combination 200 of an adapter panel 202 and a two-piece fiber optic adapter 204 according to the present invention is illustrated in FIGS. 7-12. With only one small exception, the first piece 220 of the two-piece fiber optic adapter 204 is the same as the first piece 120. The adapter panel 202 is the same as that discussed above with regard to the first embodiment. In FIGS. 8 and 8A, there is a thinner adapter panel 202 and a thicker adapter panel 202' to illustrate the positioning of the elements relative to one another. That is, the value of T1 is different from FIG. 8 to FIG. 8A.

Figure 11:
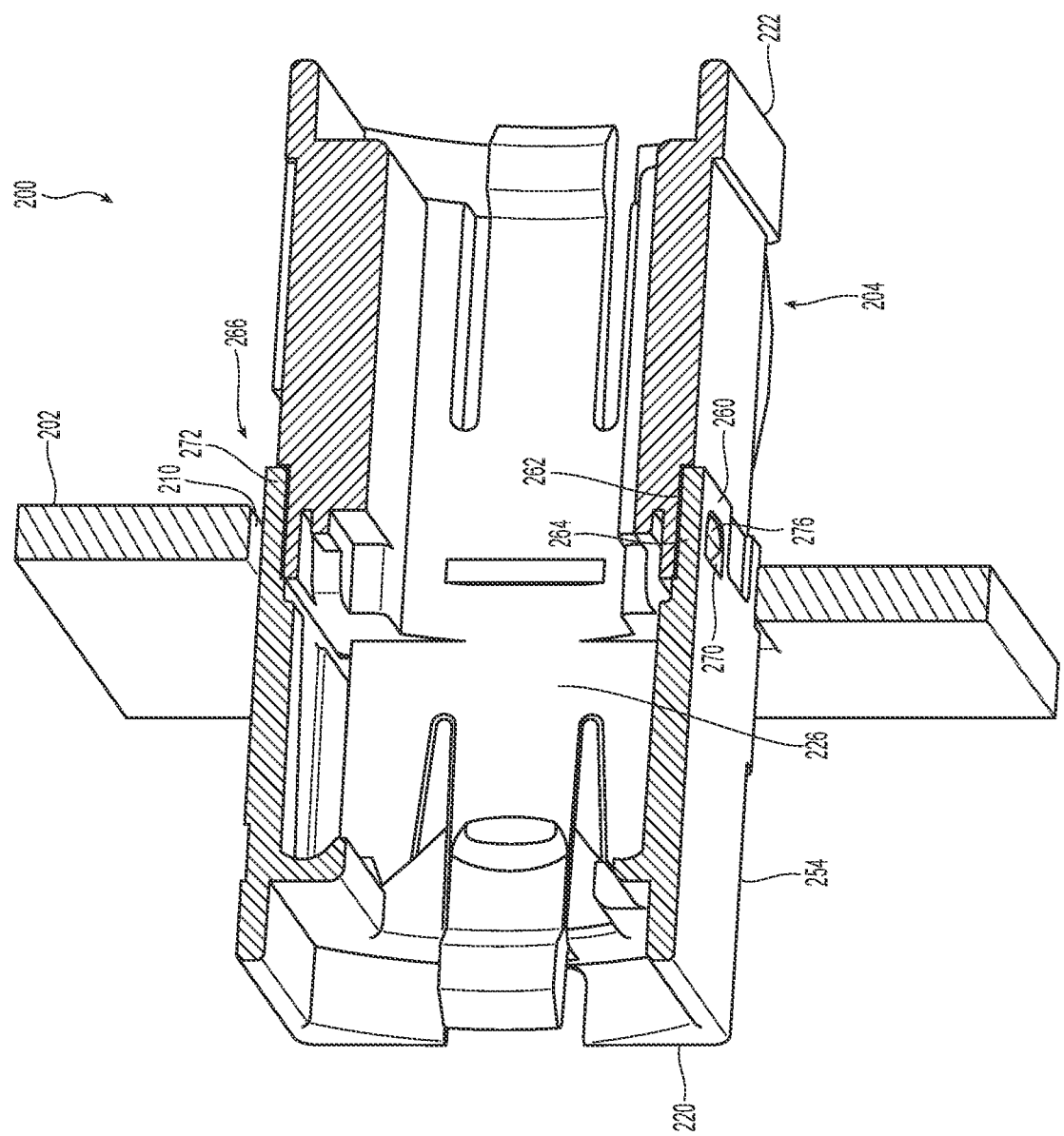
FIG. 11 is a cross sectional view of the two-piece fiber optic adapter and adapter panel in FIG. 7.

The main difference in the two combinations 100 and 200 (and 200') is that in combination 200, the second piece 222 of the two-piece fiber optic adapter 204 does not have integral latches, but rather uses the metal clip 242 to prevent the two-piece fiber optic adapter 204 from being accidently removed from the adapter panel 202. In this regard, the metal clip 242 fits around the second piece 222 of the two-piece fiber optic adapter 204 (usually in a recessed portion 244) to keep it in place on the second piece 222 of the two-piece fiber optic adapter 204. The metal clip 242 has two projections 268 that engage the first side 206 of the adapter panel 202 if the two-piece fiber optic adapter 204 is pulled on from the rear of the adapter panel 202. While two projections 268 are illustrated engaging the first side 206, the two-piece fiber optic adapter 204 could be inserted from the other side of the adapter panel 202 and engage the second side 108. In this combination 200, the space between the flange 240 and the ends 278 of the projections 268 provide the space 250 in a middle portion of the main body 224 where the panel 202 is disposed. As can be seen in FIGS. 9 and 11, the panel 202 is covering where the latching mechanism 260 is located. As seen in FIG. 9, the space 250 is in a middle portion of the main body 224. As also with the above embodiment, the latching mechanism 260 includes an overlapped portion 262 of the main body 224 of the two-piece fiber optic adapter 204. The overlapped portion 262 includes the front end 264 of the first piece 220 and the front end 266 of the second piece 222, whereby the front end 266 of the second piece 222 fits within the first piece 220. At the front end 264 of the first piece 220 are a plurality of receptacles 270. The receptacles 270 preferably extend between the outside of the first piece 220 and the longitudinal opening 226. However, the receptacles 270 may also present only on the inside of the first piece 220 and not penetrate the sides completely. Also at the front end 264 of the first piece 220 is a reduced thickness 272 of the sides. This reduced thickness 272 mates with the recessed portion 274 on the front end 266 of the second piece 222. On the recessed portion 274 are projections 276 that are positioned to be received in the receptacles 270 when the first piece 220 is mated with the second piece 222 to form the main body 224. This junction creates the overlapped portion 262. Again, there may be more or fewer of the receptacles 270/projections 276 and they may be located in other places on the main body 224.

The first piece 220 also has indentations 280 on the front end 264 of the first piece 220, one on either side of the plurality of receptacles 270. These indentations 280 correspond to the two tabs 282 on the metal clip 242 that extend upward and away from the main body 224. When the two-piece fiber optic adapter 204 in inserted into the adapter panel 102, the two tabs 282 will flex downward and may be received in the indentations 280. Once the two-piece fiber optic adapter 204 is completely inserted, the two tabs 282 will be positioned between the two-piece fiber optic adapter 204 and the adapter panel 202 to bias the two-piece fiber optic adapter 204 against the adapter panel 202 and keep it from moving around in the window 110 in the adapter panel 102, particularly if the adapter panel 102 is one of the thinner panels (e.g., the adapter panel 100 or 200). See, in particular FIG. 8A, where the adapter panel 202' is thicker than the adapter panel 202 in FIG. 8.

Figure 12:
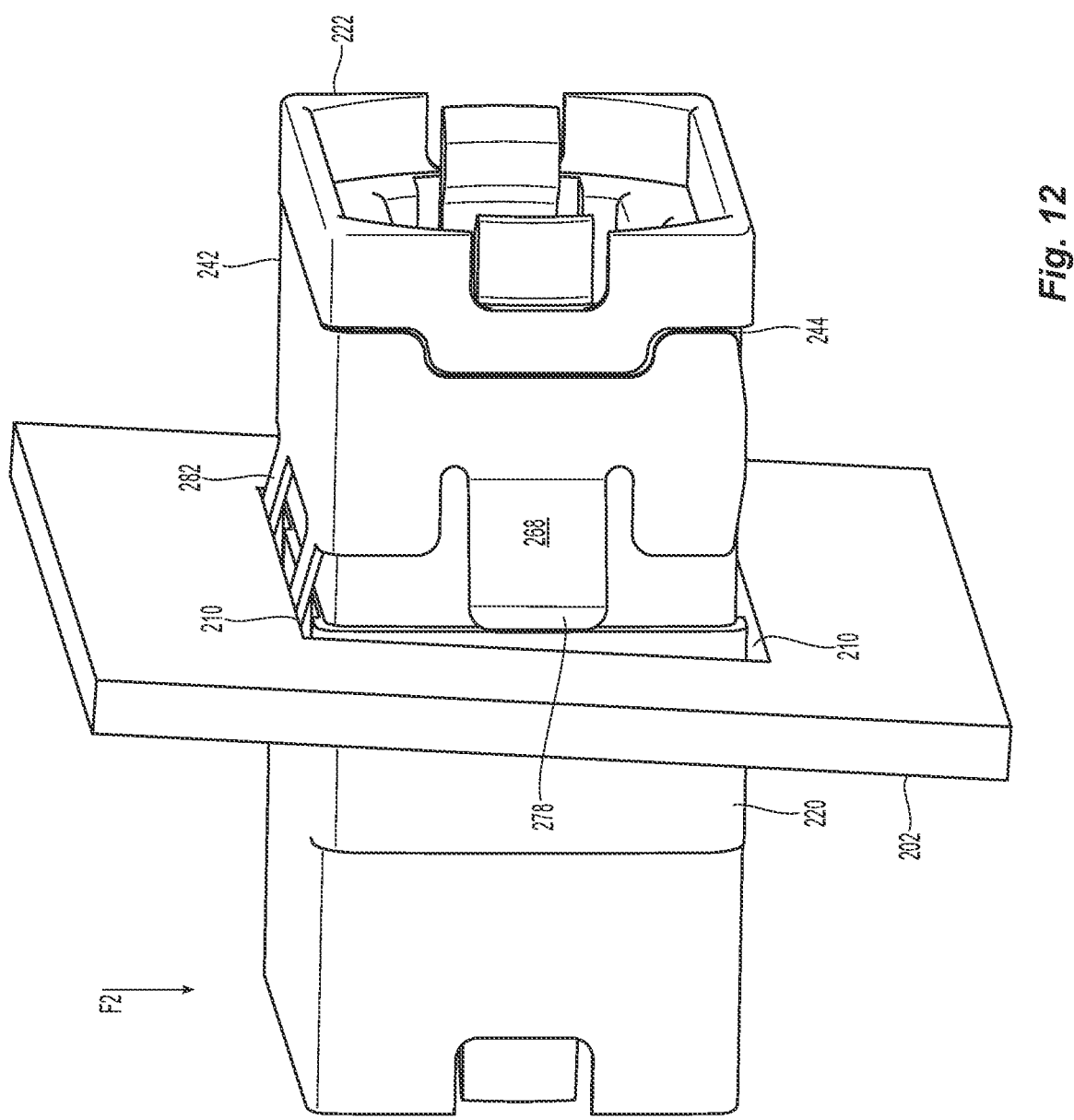
FIG. 12 is a side perspective view of the two-piece fiber optic adapter and adapter panel in FIG. 7 with a load applied to the two-piece fiber optic adapter.

As also illustrated in FIG. 12, putting a 90° proof load test in the direction of the arrow F2, the two-piece fiber optic adapter 204 will push against the adapter panel 202 within the window 210, pushing the front end 264 of the first piece 220 against the second piece 222, preventing the two pieces 220, 222 from separating. FIG. 12 shows the adapter panel 202 at an angle relative to the longitudinal axis of the two-piece fiber optic adapter 204 under load.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A combination of an adapter panel and at least one two-piece fiber optic adapter comprising:
   an adapter panel having a first side and a second side, the adapter panel having a window extending between the first side and the second side, the adapter panel having a thickness; and
   a two-piece fiber optic adapter formed by joining a first piece to a second piece via a latching mechanism, each of the first piece and second piece having a longitudinal opening to receive fiber optic connectors from either side of the adapter panel,
   wherein the latching mechanism is positioned at least partially within the window and the thickness of the adapter panel.

2. The combination of claim 1, wherein the latching mechanism is positioned completely between the first side and the second side of the adapter panel inside the window.

3. The combination of claim 1, wherein the latching mechanism is positioned within the window of the adapter panel in a longitudinal direction.

4. The combination of claim 1, wherein at least a portion of the latching mechanism engages the adapter panel when a force substantially parallel to a plane of the adapter panel is encountered by the two-piece fiber optic adapter.

5. The combination of claim 1, wherein the first piece has a front end and the second piece has a front end, the front end of one of the first piece and the second piece can be received inside the front end of the other of the first piece and the second piece.

6. The combination of claim 5, wherein the latching mechanism further comprises:
   a plurality of projections on the front end of one of the first piece and the second piece; and
   a plurality of receptacles on the front end of the other of the first piece and the second piece to receive a corresponding one of the plurality of projections.

7. The two-piece fiber optic adapter of claim 5, wherein the latching mechanism is in a middle portion of the two-piece fiber optic adapter.

8. A two-piece fiber optic adapter comprising:
   a first piece joined to a second piece to form a main body, the main body having a longitudinal opening in which to mate a pair of optical connectors, each of the first piece and the second piece having a top side, a bottom side, and two opposite sides joined by the top side and the bottom side respectively,
   the first piece having a receiving portion that receives an insertion portion of the second piece within the longitudinal opening in the first piece to form an overlapped portion of the first piece and the second piece,
   wherein one of the first piece and the second piece has at least one projection and the other of the first piece and the second piece having at least one receptacle to receive the at least one projection within the overlapped portion and wherein the overlapped portion is positioned at least partially within a window of an adapter panel.

9. The two-piece fiber optic adapter according to claim 8, wherein the overlapped portion has a first dimension in a longitudinal direction and the adapter panel into which the main body is inserted has a thickness having a second dimension, the first dimension being smaller than the second dimension.

10. The two-piece fiber optic adapter according to claim 8, wherein the at least one projection comprises at least two projections and the at least one receptacle comprises two receptacles.

11. The two-piece fiber optic adapter according to claim 9, wherein the overlapped portion, the at least one projection, and the at least one receptacle form a latching mechanism.

12. The two-piece fiber optic adapter of claim 11, wherein the latching mechanism is in a middle portion of the main body.

13. A two-piece fiber optic adapter comprising:
   a first piece joined to a second piece to form a main body, the main body having a longitudinal opening in which to mate a pair of optical connectors, each of the first piece and the second piece having a top side, a bottom side, and two opposite sides joined by the top side and the bottom side respectively,
   the first piece having a receiving portion that receives an insertion portion of the second piece within the longitudinal opening in the first piece to form an overlapped portion of the main body,
   wherein one of the first piece and the second piece has at least one projection and the other of the first piece and the second piece has at least one receptacle to receive the at least one projection within the overlapped portion,
   wherein the main body has a middle portion and the overlapped portion, the at least one projection and the at least one receptacle form a latching mechanism at the middle portion, and
   wherein the latching mechanism is positioned for being trapped by an adapter panel into which the two-piece fiber optic adapter is inserted.

14. The two-piece fiber optic adapter according to claim 13, wherein the overlapped portion has a first dimension in a longitudinal direction and the adapter panel into which the main body is inserted has a thickness having a second dimension, the first dimension is smaller than the second dimension.

15. The two-piece adapter according to claim 13, wherein the latching mechanism is substantially trapped by the adapter panel once the main body is attached to the adapter panel.

16. The two-piece fiber optic adapter according to claim 13, wherein the at least one projection comprises at least two projections and the at least one receptacle comprises two receptacles.

17. The two-piece fiber optic adapter of claim 13, wherein the latching mechanism is in a middle portion of the main body.

* * * * *